Nov. 14, 1944.   C. D. PETERSON ET AL   2,362,925
GEAR SHIFTING MECHANISM
Filed Sept. 30, 1942   3 Sheets-Sheet 2

INVENTORS:
Carl D. Peterson &
BY  Elmer J. Barth,
Bodell & Thompson
Attys

Nov. 14, 1944.  C. D. PETERSON ET AL  2,362,925
GEAR SHIFTING MECHANISM
Filed Sept. 30, 1942  3 Sheets-Sheet 3

INVENTORS:
Carl D. Peterson &
BY Elmer J. Barth
Bodell & Thompson
attys

Patented Nov. 14, 1944

2,362,925

UNITED STATES PATENT OFFICE 2,362,925

GEAR SHIFTING MECHANISM

Carl D. Peterson and Elmer J. Barth,
Toledo, Ohio

Application September 30, 1942, Serial No. 460,224

11 Claims. (Cl. 74—477)

This invention relates to change-speed transmissions in which the power may be delivered at various gear ratios in a main gear box to two points through trains of gears in a transfer gear box or at the will of the operator through one of said points, as for instance, a transmission mechanism for delivering power to the rear driving axle of a vehicle and/or at the will of the operator at certain gear ratios in the main gear box to the front steering wheels, as for instance, so-called half-track, three-quarter track trucks or all wheel trucks.

The gearing in the transfer box usually embodies high and low gear ratios controlled by shiftable elements, usually shiftable jaw clutches. The gearing in the main gear box is of any conventional construction embodying a plurality of forward speeds and reverse, as four speeds forward and reverse, and the gear changes are controlled by selecting and shifting mechanism including shift rods, one rod controlling first and second speeds; a second rod, third and fourth speeds; and a third rod reverse. The gearing in the transfer box embodies shiftable elements, usually shiftable jaw clutches for cutting in and out the drive to the front steering wheels and for shifting the drive from a normal high gear ratio to a low gear ratio. The shifting of the clutches in the transfer gear box or case is effected by shifting mechanism including shift rods, and means for shifting them, and further controlled by the shift rods in the main gear box.

The invention has for its object an interlocking mechanism between the shift rods in the main gear box and the shift rods for the transfer gear box by which the shifting of the shift rod for the front wheel drive is controlled by the shifting mechanism or shift rods for the main gear case. More specifically, it has for its object a shifting mechanism for cutting in and out of the front wheel drive and the drive through high and low ratios in the transfer box, wherein the front wheel drive must be "in" with first gear in the main gear box and low in the transfer gear box or with reverse gear in the main gear box and low in the transfer gear box, and the front wheel drive is optional with first gear in the main gear box and high in the transfer box, and with reverse in the main gear box and high in the transfer gear box, the low in the transfer box being optional in all speeds of the main gear box, so that the transmission has four speeds forward and reverse, with high in the transfer box, and another range of four speeds forward and reverse with low in the transfer box.

The invention consists in the novel features and in the combinations and constructions hereinafter set forth and claimed.

In describing this invention, reference is had to the accompanying drawings in which like characters designate corresponding parts in all the views.

Figure 1:
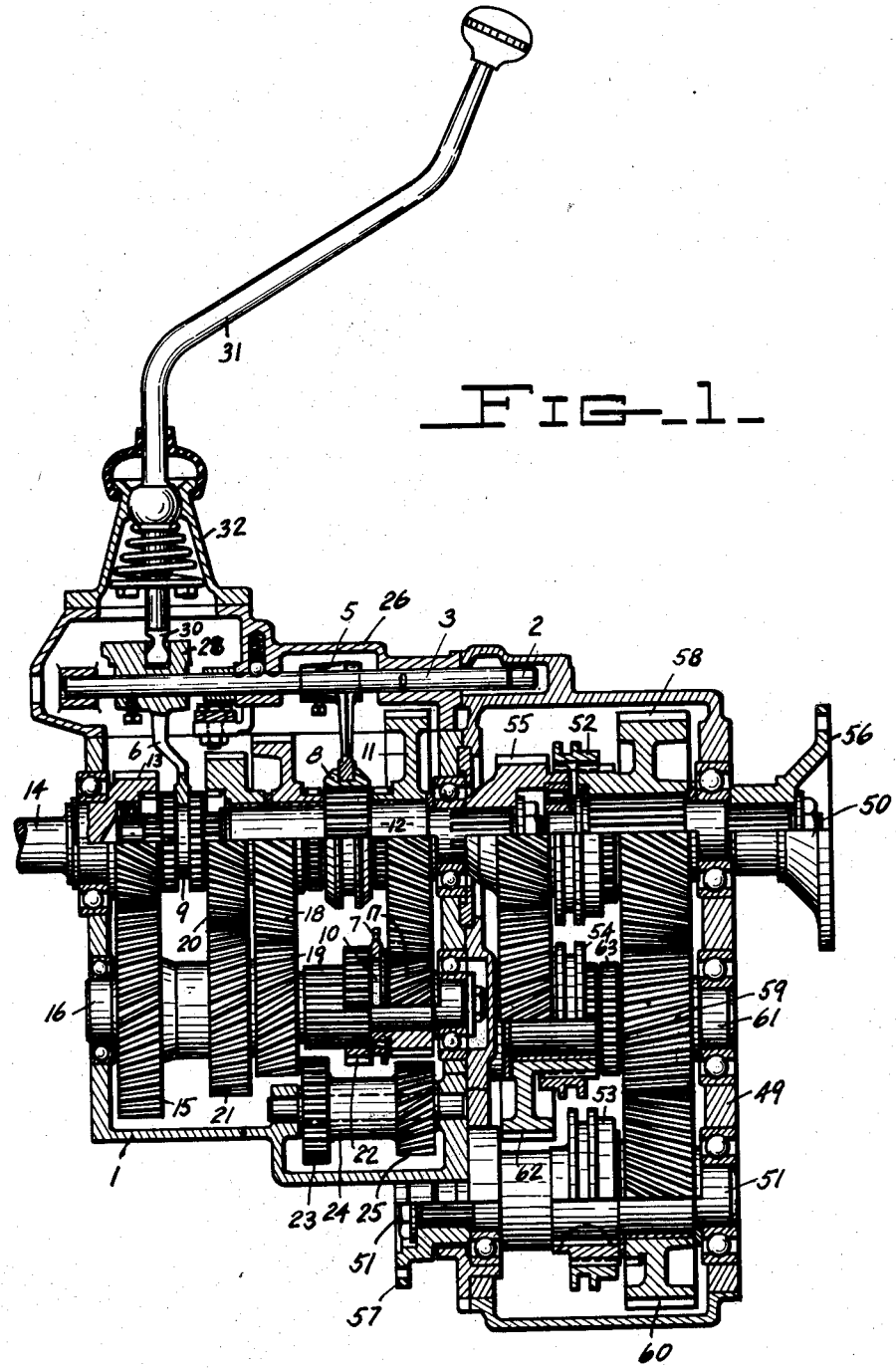
Figure 1 is a longitudinal sectional view of this gearing showing the gear arrangement.
Figure 2:
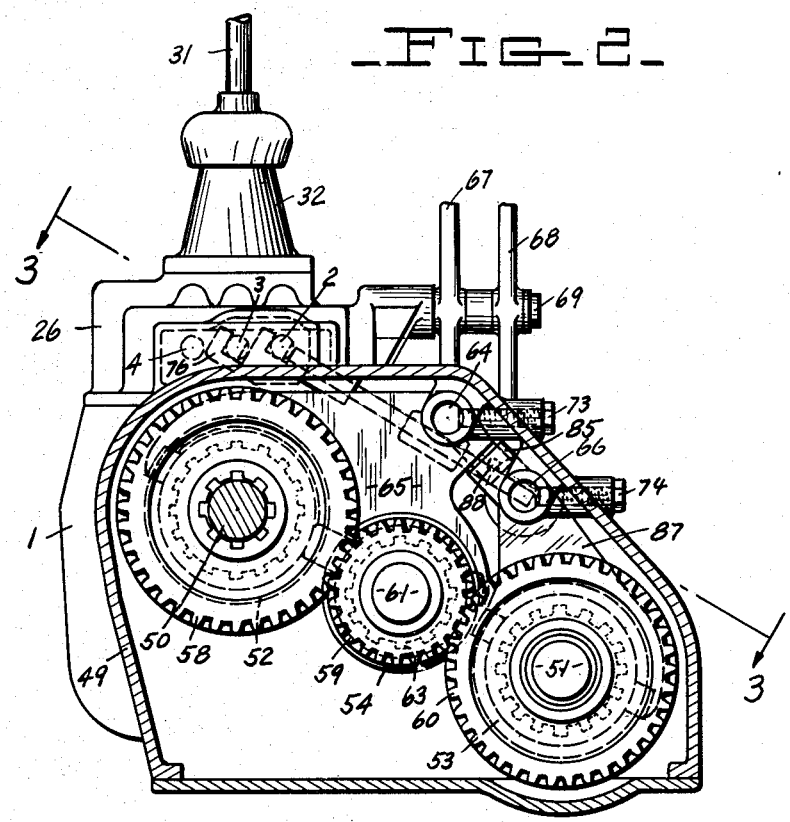
Figure 2 is an elevation looking to the left in Figure 1, the casing or box being in section.
Figure 5:
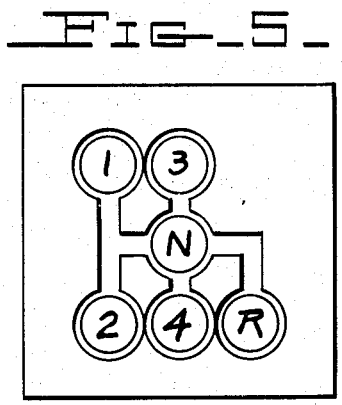
Figure 5 is a chart showing the movement of the selecting and shifting lever for the main gearing.
Figure 3:
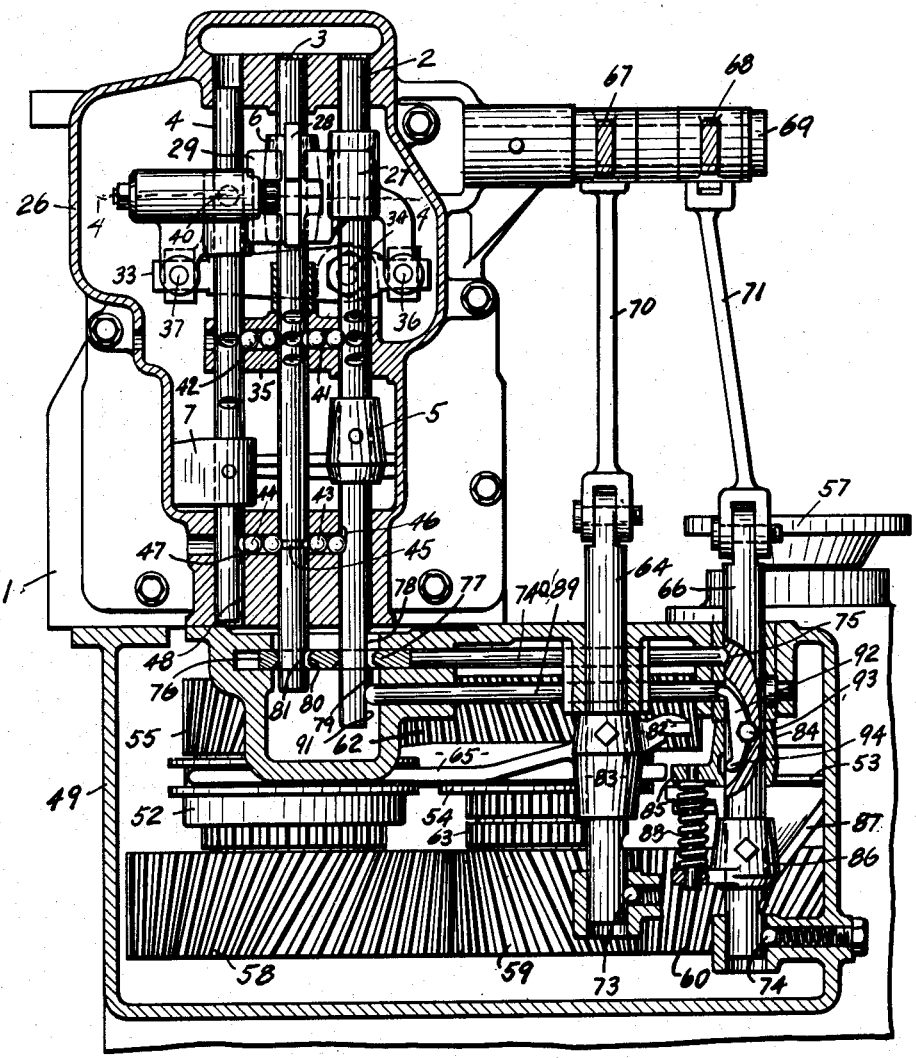
Figure 3 is an enlarged fragmentary sectional view on line 3—3, Figure 2.

I designates the main gear box, which houses the selective, variable speed gearing operable to produce a plural number of speeds forward, one of which is direct drive, and three forward indirect drives, and one reverse. The mechanism for effecting the gear shifts is here shown as including three shift rods 2, 3 and 4 operating forks 5, 6 and 7, which coact with clutches 8, 9 and 10 respectively. The clutch 8 operated by the rod 2 is shifted to the right (Figure 1) from neutral to clutch gear 11 to the output shaft 12 of the gearing to produce first speed forward through gear 13 on the input shaft 14 of the gearing, gear 15 on the countershaft 16 and gear 17 on the countershaft meshing with the gear 11. The clutch 10 normally stands in position to clutch the gear 17 to the countershaft 16 for all forward speeds.

Shifting of the rod 2 forward, or to the left, shifts the clutch 8 to clutch the gear 18 to the output shaft 12 to produce second speed through the gears 13, 15, countershaft 16 and gear 19 keyed on the countershaft, which gear 19 meshes with the gear 18. Clutch 9 is shifted in opposite directions from neutral by the shift rod 3. Shifting of the clutch 9 to the right clutches gear 20 to the output shaft 12, so that the drive is from the input shaft 14 through gears 13, 15, countershaft 16, gear 21 keyed on the countershaft and meshing with the gear 20. Shifting of the clutch 9 to the left from neutral clutches the input and output shafts 14 and 12 respectively, directly together in direct drive, these shafts being mounted in axial alinement in the gear box with the output shaft 12 having a pilot bearing within the gear 13. Shifting of the reverse rod 4 from neutral shifts the clutch 10, which is also a clutch gear, to now unclutch the countershaft gear 17 from the countershaft 16 and shift the gear 22 of the clutch 10 into mesh with the gear 23 at one end of a reverse spool 24 having a gear 25 at the other end, which meshes with the gear 11 on the shaft 12.

Through mechanism to be described, when the reverse rod 4 is operated to shift the clutch gear 10 to unclutch the gear 17 and to mesh with the gear 23 of the reverse spool 24, the shift rod 2 is automatically shifted to carry the clutch 8 into first speed position, that is, in position to clutch the gear 11 to the output shaft 12. The input shaft 14 is the main engine clutch shaft and connected through the usual clutch to the crank shaft of the engine of the vehicle.

The shift rods 2, 3, 4 are slidably mounted in a cover 26 of the gear box in the usual manner, and are provided with blocks 27, 28 and 29 thereon formed with notches arranged in transverse alinement when the rods are in neutral position for coacting with the finger 30 of the selecting and shifting lever 31 having a lateral selecting and a fore-and-aft shifting movement. The shifting fork 6 for the third and fourth speed rod 3 is carried by the block 28. The selecting and shifting lever 31 is mounted in any well known manner, as in a tower 32 on the cover 26 of the gear box 1.

As before stated, reverse speed is effected by shifting the first and second speed rod 2 into first speed position, upon the shifting of the reverse rod into reverse position. This automatic shift of the first speed rod 2 is effected by motion transmitting means between the reverse rod 4 and the first and second speed rod 2 and a coupling which operates to couple the reverse rod 4 to the motion transmitting means only when the reverse rod 4 is selected by the finger 30 of the selecting and shifting lever 31. This motion transmitting means consists of a lever 33 (Figure 4) pivoted as at 34 to a bracket extending from a cross-frame member 35 within the cover and pivoted at 36 and 37 to arms on the shifting blocks 27 and 29 respectively. The pivotal joints 36, 37 are such that the ends of the lever and the arms on the block may have a sliding movement during the arcuate movement of the ends of the lever. The block 27 is fixed in any suitable manner to the first and second speed shift rod 2 while the block 29 on the reverse rod 4 is slidably mounted on the rod 4, or the rod 4 is capable of sliding in the block 29, except when the reverse rod 4 has been selected by the finger 30 of the lever 31.

Figure 4:
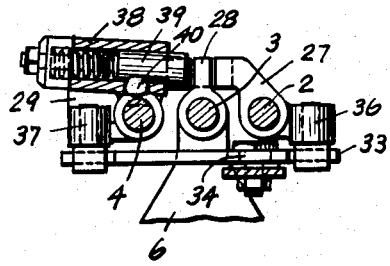
Figure 4 is a sectional view taken approximately on the line of 4—4, Figure 3, of the shifting mechanism and contiguous parts.

As seen in Figure 4, the block 29 on the reverse rod 4 is formed with a guide 38 extending at an angle to the rod 4 crosswise of and above the same, and a spring-pressed plunger 39 is movable in the guide 38, the end of the plunger projecting into the notch of the block 29 into the path of the finger 30 of the selecting and shifting lever 31, so that the plunger is pressed inwardly when the reverse block 29 is selected. The plunger 39 is formed with a cam notch into which a ball 40 extends, the ball being located in a passage opening into the bore of the block 29 through which the rod 4 extends, and the rod is formed with a notch alined with the passage. The length of the passage and the diameter of the ball is such that when the plunger 39 is in normal position, the reverse rod 4 will cam the ball 40 out of the slot in the reverse rod and into the notch of the plunger, so that the block 29 can idle or slide along the rod 4 without shifting it when the first and second speed rod 2 is selected and shifted, but when the reverse block 29 is selected, the finger of the selecting lever shifts the plunger 39, camming the ball 40 out of the notch therein and into the notch in the reverse rod 4, thus locking the block 29 and the reverse rod 4 together, so that now upon shifting of the selected reverse rod 4, the rod 4 will be shifted into reverse position and the motion thereof transferred through the lever 33 to the first and second speed rod 2 to shift it into first speed position.

Means is provided for locking the unselected and unshifted rods from shifting movement, and this means may be of any suitable construction, as balls 41, 42, located in transverse passages in the cross-frame 35 within the cover, the balls 41 coacting with notches in opposing sides of the shift rods 2, 3 and the balls 42 coacting with notches in the opposing shift rods 3, 4. Upon shifting of the first and second speed rod 2, the balls 41 are shifted by the camming action of the notch in the rod 2 into the notch in the rod 3, thus locking the rod 3 from movement, and upon shifting of the rod 3 from neutral, the balls 41, 42 are cammed in opposite directions to enter notches in the rods 2 and 4 and lock them in neutral position. As reverse is effected by shifting the reverse rod 4 when the first and second speed rod is selected and shifted, the reverse rod is locked from shifting movement by similar balls 43, 44, the balls 43 being located in a transverse passage between the rods 2 and 3 and coacting with notches in the opposite sides of these rods, and the balls 44 being located in a passage between the rod 3 and reverse rod 4 and coacting with notches in opposing sides, and a plunger 45 extending transversely through the rod 3 and long enough to transmit the transverse movement of one set of balls 43, 44 to the other, when either the rod 2 or the rod 4 is shifted. When only the first and second speed rod 2 is selected and shifted, the reverse rod 4 is thus locked from shifting movement. In order that the first and second speed rod may not be locked, when the reverse rod is selected and shifted, because of the motion transmitting lever 33, the notch 46 and the first and second speed rod is wide enough to permit the shift rod 2 to move far enough toward first speed position to allow the ball 44 which coacts with the reverse rod 4 to clear the hump or projection 47 and enter a groove or long notch 48 in the reverse rod, so that the rod 2 is not locked, and the motion of the reverse rod may be transferred thereto.

49 designates the transfer gear box. This is mounted on the rear end of the main gear box 1. The transfer gearing includes a tail shaft 50 and a second tail shaft 51, a shiftable element or a clutch 52 operable to connect the tail shaft 50 with the output shaft 12 of the main gearing, a gear train through which the tail shaft 51 may be driven with the tail shaft 50, a second shiftable element or clutch 53 operable to connect and disconnect the second tail shaft 51 in and out of the train or from being actuated with the tail shaft 50, and another gear train for driving both tail shafts from the output shaft 12 of the gearing at a lower speed including a third shiftable element 54 shiftable to connect and disconnect the tail shafts from the output shaft 12 through the low speed gearing. The tail shaft 50 is arranged in alinement with the output shaft 12, and has a pilot bearing in a gear 55 mounted on the end of the output shaft, which projects into the transfer gear box 49. The shiftable element or clutch 52 is shiftable to clutch the shafts 12 and 50 directly together. The tail shaft 50 is provided with a suitable means, as 56, for coupling the propeller shaft, or other means which is connected to the rear drive shaft of the vehicle. The other tail shaft 51 is provided with a suitable coupling means, as 57, for connection to the front steering wheels of the vehicle to drive the same, when the vehicle is to be driven by both the tracks and the steering wheels, when the clutch 52 clutches the output shaft 12 and tail shaft 50 directly together, this being called "high." The tail shaft 51 is driven in high from the tail shaft 50 through gears 58, 59 and 60 mounted respectively on the tail shaft 50, an intermediate shaft 61 and on the second tail shaft 51. The clutch 52, when in engaged position, operates to clutch the gear 58 to the gear 55 on the output shaft, the gear 58 being splined on the tail shaft 50. The gear 60 is rotatably mounted on the tail shaft 51, and when the clutch 53 is in engaged position, the tail shaft 51 will be driven with the tail shaft 50 through the gears 58, 59 and 60. When the clutch 53 is disengaged and the clutch 52 engaged, only the tail shaft 50 will be driven. The tail shafts 50 and 51 are driven through a low gear ratio, through a gear 62 rotatably mounted on the intermediate shart 61 and clutchable thereto by the clutch 54 on the hub of the gear 62 and shiftable into clutching engagement with a clutch ring 63 on the shaft or gear 59. When the clutch 54 is shifted into engagement with the clutch ring 63 and the clutch 53 is engaged, both tail shafts are driven from the output shaft 12 through the gear 55, gear 62, shaft 61 and gear 59 which meshes with both the gears 58 and 60 on the tail shafts respectively. The clutches 52 and 54 are shifted by a double fork 65 in unison, so that when either is shifted out of clutching engagement, the other is shifted into clutching engagement.

The shifting mechanism for the transfer gearing includes a shift rod 64 common to the first and third clutches 52, 54 and connected thereto by the double fork 65. The clutch 53, which controls the cutting in and out of the front wheel drive, is effected by a shift rod 66, the rods 64 and 66 being mounted to slide in the transfer gear box 49 parallel to each other and parallel to the shift rods 2, 3 and 4. The operation of the rod 66, which controls the cutting in and out of the front wheel drive or the tail shaft 51, is controlled by the shift rods of the main gear box through interlocking means to be decribed. The front wheel drive must be in with first speed in the main gear effected through the shift rod 2 and low in the transfer gear box effected by shifting in of the third clutch 54, or must be in reverse effected by the rod 4 of the main gear box and low effected by the third clutch 54 of the transfer box. The front wheel drive is optional with first gear in the main gear box effected by the shift rod 2 and high in the transfer gear box effected by the clutch 52, or with reverse in the main gear box effected by the reverse rod 4 and high in the transfer gear box through the clutch 52. However, low in the transfer box through the clutch 54 is optional in all speeds of the main transmission.

First, second, third and fourth speeds forward and one reverse is obtained through the gears of the main gear box, and also four additional under-drives or eight forward speeds in all, and one reverse, may be obtained through shifting in of the clutch 54.

The rods 64 and 66 are operated by levers 67 and 68 mounted on a stud 69 on the side of the main gear box and links 70 and 71 between the levers and the rods 64 and 66 respectively. The rods are held in starting position by any suitable means, as spring-pressed poppets 73, 74. The interlock for compelling the use of front wheel drive when in first gear in the main gear box and low in the transfer box or reverse in the main gear box and low in the transfer box, as here shown, comprises a lock rod 740 suitably guided in a passage provided in the transfer case 49 and having one end arranged to enter a cam-shaped notch 75 in the shift rod 66, when the shift rod is inoperative or in "out" position, the rod having a plate 76 at its other end formed with a passage therethrough through which the first and second speed rod 2 extends, the plate having a tooth 77 at one side of the rod 2 for entering a cam-shaped notch 78 in the rod 2, when this rod is in neutral position, this notch being wide enough to receive the tooth 77 when the rod 2 is shifted into first speed position. When, however, the rod 2 is shifted into second speed position, the lift or hump 79 rides up on the tooth 77 and holds the rod 74 from endwise movement, and hence locked in the notch 75 of the rod 66. Conversely the first and second speed rod is locked from shifting into second speed position, when the shift rod 66 is in clutch engaged position. The plate 76 also has a passage through which the third and fourth speed rod 3 extends and formed with a tooth 80 for entering a cam-shaped notch 81 in the rod 3, so that when third or fourth speed shift rod is shifted, the high portion thereof rides up on the tooth 80 and locks the lock rod 740 from movement. If the shift rod 66 is in shifted position to cut in front wheel drive, when an attempt is made to shift the rod 2 into second speed forward, or the rod 3 into third or fourth speed forward, such attempt will be blocked by the fact that the lock rod 740 is shifted completely into the notches 78 and 81, and hence locks the rods 2, 3 from movement. However, the shift may be made into first speed forward, because of the wide slot 78 while the rod 66 is shifted into front wheel drive position. As the first and second speed rod 2 is shifted into first speed position by the selecting and shifting of the reverse rod 4, the front wheel drive shift rod 66 is free to be shifted, when the shift rod 4 is in reverse position, as then the first speed and second speed rod 2 being in first speed position, the tooth 77 of the lock rod 740 is alined with the wide notch 78.

In order to compel front wheel drive to be in with low gear ratio of the transfer box, when the gearing of the main gear box is in first speed forward or reverse, means is provided for blocking shifting of the rod 64 when the rod 66 is in its position assumed when the front wheel drive clutch 53 is disengaged or unclutched from the gear 60. This means comprises an arm 82 on the hub 83 of the double fork 65, a sleeve 84 slidably mounted on the rod 66 and having a shoulder 85 extending into the path of the arm 82, the shoulder being connected by a tie or push rod 88 to the hub 86 of the fork 87 which shifts the front wheel drive clutch 53, the hub 86 being keyed to the rod 66, and an interlock operable by the rod 2 when shifted to first speed position to lock the sleeve 84 to the rod 66, so that upon operation of the first and second speed rod into first speed position, the lock is operated, and hence, if the rod 64 is shifted, the shoulder 82 will encounter the shoulder 85, and additional movement will shift the rod 66 with the sleeve 84, and hence shift the fork collar 86 to shift the fork 87 and front wheel clutch 53 into engaged position, or will compel the shifting of the rod 66 into front wheel drive position before the shifting of the rod 64 can be completed. This interlock operated by the first speed rod 2 consists of a sliding bolt 89 mounted in a suitable guide in the transfer gear box parallel to the rod 74 and coacting at one end with a groove or notch 91 in the first and second speed rod 2 and at its other end thrusting against one arm of a rocking key 92 pivoted between its ends at 93 in a recess in the rod 66, the other arm having a nose 94 for entering an internal notch in the bore of the sleeve 84. When the first and second speed rod 2 is shifted from neutral to first speed position, the hump or high point 79 at one end of the wide notch 78 shifts the bolt 89 and effects the rocking of the locking key 92 to lock its nose 94 in the notch of the sleeve 84. Hence, upon shifting of the first speed rod 2 into first speed position, either by selecting and shifting said rod 2 or by selecting and shifting the reverse rod 4, the front wheel drive shift rod 66 will be locked to the collar 84, so that upon shifting of the low ratio shift rod 64 of the transfer gearing, the front wheel drive shift rod must be shifted to shift the front wheel drive clutch 53 into engaged position.

The general operation is as follows:

The clutch 52 is normally in position to connect the output shaft 12 and tail shaft 50 in direct drive relation and the clutch 54 is in "out" position. The front wheel drive clutch 53 is also in "out" position. Thus, in the normal operation, the tail shaft 50 for the rear or track drive can be operated through the forward speeds and reverse of the main gear box. When it is desired to use a front wheel drive, as on rough roads or rough terrain, or in any place, except on smooth or paved roads, the front wheel drive clutch 53 can be shifted into clutching position only when the first and second speed rod 2 is in neutral or in first speed position. It is so shifted by operating the lever 68 to shift the rod 66, but on account of the interlock 740 can only be shifted when the first and second speed rod is in neutral or first speed position. When the rod 2 is in neutral position or first speed position, the rod 66 must be shifted out of clutching position before a shift can be made into a second speed forward or before the third and fourth speed rod 3 can be shifted from neutral. By shifting the lever 67, the shift rod 64 controlling the low gear ratio in the transfer gear box is operated to shift out the clutch 52 and to shift in the clutch 54. The front wheel drive clutch 53 must thus be shifted in whenever the rod 64 controlling the low gear ratio of the transfer gearing is operated to engage the clutch 54 and disengage the clutch 52, because if an attempt is made to shift the shift rod 64 when the front wheel shift rod 66 is in "out" position, the shifting of the first and second speed rod into first speed position will cause the front wheel drive shift rod 66 to be locked to the sleeve 84, which is encountered by the shoulder 82 on the fork of the shift rod 64, and hence the rod 66 shifted into front wheel drive. When the rod 64 is shifted into low gear ratio and because of the interlock 740, such shifting into low gear ratio compels the shifting in of the front wheel drive clutch.

What we claim is:

1. The combination of a main change-speed transmission gearing including shiftable elements and shifting mechanism therefor including a plurality of selectively operable shift rods, and a transfer gearing including first and second tail shafts and gearing for driving the tail shafts from the main gearing through high and low gear ratios including shiftable elements operable to connect and disconnect the second tail shaft from drive with the first and for shifting the transfer gearing into high and low gear ratios in the transfer gearing, and shifting mechanism for the last shiftable element including a pair of individually operable shift rods, one operable to connect and disconnect the second tail shaft from drive and the other to effect the shifting from high to low ratios and vice-versa, an interlock between one of the shift rods for the main gearing and the one shift rod for controlling the second tail shaft and operable to permit the shifting in of the shift rod controlling the second tail shaft only when the one shift rod for the main gearing is in a predetermined shifted position, and an additional interlock between the one of the shift rods for the main gearing and the shift rod of the transfer gearing compelling the shifting in of the element controlling the second tail shaft, when the shift rod for effecting low in the transfer box is shifted into low speed position.

2. The combination with a variable speed transmission gearing embodying an output shaft, and selecting and shifting mechanism which includes a plurality of shift rods shiftable from neutral, and means for selecting and shifting them, a transfer gearing including a tail shaft, and means for coupling it to the output shaft, a second tail shaft, a gear train between the tail shafts including a shiftable element for connecting and disconnecting the second tail shaft from drive with the first tail shaft, and shifting mechanism for operating said shiftable element including a shift rod, and means for shifting it; of interlocking means between one of the former shift rods and the last shift rod and operable by said one of the former shift rods, for permitting shifting of the last shift rod only when the one of the former shift rods is in a predetermined shifted position.

3. The combination with a change-speed transmission gearing embodying an output shaft, and selecting and shifting mechanism which includes a reverse shift rod shiftable in one direction from neutral, a first and second speed shift rod shiftable in opposite directions from neutral, and means for selecting and shifting the rods, a transfer gearing including a tail shaft, means for coupling it to the output shaft, a second tail shaft, a gear train between the tail shafts, a shiftable element for connecting and disconnecting the second tail shaft from drive by the first tail shaft, a shift rod for the shiftable element, and means for operating it; of interlocking means between the first and second speed shift rod and the shift rod for the shiftable element operable thereby and operable by said first and second shift rod, for permitting shifting of the rod of the shiftable element only when the first and second speed shift rod is in neutral or in first speed position.

4. The combination with a change-speed transmission gearing embodying an output shaft, selecting and shifting mechanism which includes a reverse shift rod shiftable in one direction from neutral, a first and second speed shift rod shiftable in opposite directions from neutral, means for selecting and shifting the rods, a transfer gearing including a tail shaft, means for coupling it to the output shaft, a second tail shaft, a train of gears between the tail shafts, a shiftable elements for connecting and disconnecting the second tail shaft from drive by the first tail shaft, a shift rod for the shiftable element, and means for operating it; of interlocking means between the first and second speed shift rod and the shift rod for the shiftable element and operable thereby for permitting shifting of the rod of the shiftable element only when the first and second speed shift rod is in neutral or in first speed position, the shifting mechanism for the reverse rod and the first and second speed rod including motion transmitting means between them operable to shift the first and second speed rod out of neutral into first speed position when the reverse rod is selected and shifted from neutral, including a coupling operable to couple the reverse rod and the motion transmitting means, only when the reverse rod is selected.

5. The combination with a gear shifting mechanism for variable speed transmission gears embodying an output shaft, selecting and shifting mechanism which includes a first and second speed shift rod, a third and fourth speed shift rod shiftable in opposite directions from neutral, a reverse shift rod shiftable in one direction from neutral, and a selecting and shifting lever for selecting and shifting any one of the rods, with reverse speed effected only through one of the forward gear trains, a transfer gearing including a tail shaft, means for coupling the same to the output shaft, a second tail shaft, a gear train between the tail shafts, a shiftable element for connecting and disconnecting the second tail shaft from drive through the gear train, with the first tail shaft, shifting mechanism for the shiftable element including a shift rod, and means for operating it; of interlocking means between the first and second speed rod and the rod for the shiftable element, for permitting shifting of the same only when the first and second speed rod is in neutral or in its first speed position, said interlock coacting with the third and fourth speed shift rod to be shifted into locked position by the shifting of the third and fourth speed rod out of neutral and operating to lock the first and second speed rod from shifting movement out of neutral when the rod for the shiftable element is in shifted position out of neutral, and motion transmitting means between the reverse rod and the first and second speed rod for shifting the latter into first speed position when the reverse rod is selected and shifted from neutral including a coupling operable to couple the reverse rod and the motion transmitting means only when a reverse rod is selected.

6. The combination with a variable speed transmission gearing embodying forward and reverse gearing, an output shaft and selecting and shifting mechanism which includes a first and second speed shift rod, a third and fourth speed shift rod shiftable in opposite directions from neutral, a reverse rod shiftable in one direction from neutral, means for selecting and shifting them, with reverse speed effected only through one of the forward gear trains, a transfer gearing including a tail shaft, a shiftable element for connecting and disconnecting the tail shaft and the output shaft, a second tail shaft, a gear train between the tail shafts, a second shiftable element for connecting and disconnecting the second tail shaft from drive through the gear train with the first tail shaft, motion transmitting means operable to connect both tail shafts with the output shaft through indirect gearing to both shafts including a third shiftable element, means for shifting the first and third shiftable elements to shift the first into engaged position and the second shiftable element out of engaged position and vice-versa including a fourth rod, and means for shifting it, a fifth shift rod operable to shift the second shiftable element into and out of engaged position, and means for shifting it, means operable by the shifting of the first and second speed rod into first speed position to compel the shifting of the fifth shift rod to shift its shiftable element into engaged position upon the shifting of the fourth shift rod into shifted position.

7. The combination with a variable speed transmission gearing embodying forward and reverse gearing, an output shaft and selecting and shifting mechanism which includes a first and second speed shift rod, a third and fourth speed shift rod shiftable in opposite directions from neutral, a reverse rod shiftable in one direction from neutral, with reverse speed effected only through one of the forward gear trains, means for selecting and shifting them, a transfer gearing including a tail shaft, a shiftable element for connecting and disconnecting the tail shaft and the output shaft, a second tail shaft, a gear train between the tail shafts, a second shiftable element for connecting and disconnecting the second tail shaft from drive through the gear train with the first tail shaft, motion transmitting means operable to connect both tail shafts with the output shaft through indirect gearing to both shafts including a third shiftable element, means for shifting the first and third shiftable elements to shift the first into engaged position and the second shiftable element out of engaged position and vice-versa, including a fourth rod, and means for shifting it, a fifth shift rod operable to shift the second shiftable element into and out of engaged position, and means for shifting it, means operable by the shifting of the first speed rod into first speed position to compel the shifting of the fifth shift rod to shift its shiftable element into engaged position upon the shifting of the fourth shift rod into shifted position, and motion transmitting means between the reverse rod and the first and second speed rod for shifting the first and second speed rod out of neutral position when the reverse rod is selected and shifted from neutral including a coupling operable to couple the reverse rod and the motion transmitting means only when the reverse rod is selected.

8. The combination with a main variable speed gearing embodying an output shaft, and shifting mechanism therefor including shift rods and means for selecting and shifting them, a transfer gearing including first and second tail shafts, a first shiftable element operable to connect the output and first tail shafts in direct drive relation, gearing operated by the output shaft and including gears to drive the second tail shaft from the first tail shaft, and a second shiftable element operable to connect and disconnect the second tail shaft from drive by the first tail shaft, and gears to actuate both shafts through indirect drives from the output shaft including a third shiftable element, shifting mechanism for the shiftable elements of the transfer gearing including a shift rod common to the first and third shiftable elements and optionally operable with all speeds of the main gearing, the first shiftable element being in engaged position, when the third shiftable element is out of engaged position and vice-versa, a shift rod for the second shiftable element, and interlocking means between one of the shift rods of the main gearing when shifted into engaged position for compelling the shifting of the rod for the second shiftable element into engaged position, when the shift rod for the first and second shiftable elements is operated to shift in the indirect gear ratio of the transfer gearing.

9. The combination with a main variable speed gearing embodying an output shaft, and shifting mechanism therefor including shift rods and means for selecting and shifting them, a transfer gearing including first and second tail shafts, a first shiftable element operable to connect the output and first tail shafts in direct drive relation, gearing operated by the output shaft and including gears to drive the second tail shaft from the first tail shaft, and a second shiftable element operable to connect and disconnect the second tail shaft from drive by the first tail shaft, and gears to actuate both shafts through indirect drives from the output shaft including a third shiftable element, shifting mechanism for the shiftable elements of the transfer gearing including a shift rod common to the first and third shiftable elements and optionally operable with all speeds of the main gearing, the first shiftable element being in engaged position, when the third shiftable element is out of engaged position and vice-versa, a shift rod for the second shiftable element, and interlocking means between one of the shift rods of the main gearing when shifted into engaged position for compelling the shifting of the rod for the second shiftable element into engaged position, when the shift rod for the first and second shiftable elements is operated to shift in the indirect gear ratio of the transfer gearing, said means comprising a sleeve on the shift rod for the second shiftable element, a locking member carried by the last rod and normally in idle position, and means operated by said one of the rods of the main gearing to operate the locking member to lock the sleeve to its rod, said sleeve and the rod for shifting the first and second shiftable elements having opposing shoulders normally spaced apart, the shoulder on the sleeve being located to block the shifting of the rod for the first and third shiftable elements when the rod for the second shiftable element is disengaged.

10. The combination with a main variable speed gearing embodying an output shaft, and shifting mechanism therefor including shift rods and means for selecting and shifting them, a transfer gearing including first and second tail shafts, a first shiftable element operable to connect the output and first tail shafts in direct drive relation, gearing operated by the output shaft and including gears to drive the second tail shaft from the first tail shaft, and a second shiftable element operable to connect and disconnect the second tail shaft from drive by the first tail shaft, and gears to actuate both shafts through indirect drives from the output shaft including a third shiftable element, shifting mechanism for the shiftable elements of the transfer gearing including a shift rod common to the first and third shiftable elements and optionally operable with all speeds of the main gearing, the first shiftable element being in engaged position, when the third shiftable element is out of engaged position and vice-versa, a shift rod for the second shiftable element, and interlocking means between one of the shift rods of the main gearing when shifted into engaged position for compelling the shifting of the rod for the second shiftable element into engaged position, when the shift rod for the first and second shiftable elements is operated to shift in the indirect gear ratio of the transfer gearing, said means comprising a sleeve on the shift rod for the second shiftable element, a locking member carried by the last rod and normally in idle position, means operated by said one of the rods of the main gearing to operate the locking member to lock the sleeve to its rod. said sleeve and the rod for shifting the first and second shiftable elements having opposing shoulders normally spaced apart, the shoulder on the sleeve being located to block the shifting of the rod for the first and third shiftable elements when the rod for the second shiftable element is disengaged, and an interlock between said one of the shiftable rods of the main gearing and the shift rod for the second shiftable element operable to prevent shifting of either rod unless the shift rod for the third shiftable element is in shifted poistion.

11. In a variable speed transmission gearing including shiftable elements and two tail shafts, a main shift rod operable in opposite directions from neutral to effect different gear changes, a first additional shift rod optionally shiftable at any time to effect a different gear change in connection with the main shift rod when in one of its shifted position, a second additional shift rod shiftable to connect one of the tail shafts to, and disconnect the same from, drive through the gearing, means individual to each of the rods for shifting them, and means operated by the shifting of the first rod in one direction from neutral to compel the shifting of the second additional rod, if the first additional rod is operated from neutral position.

CARL D. PETERSON.
ELMER J. BARTH.